United States Patent [19]

Rhodes

[11] 3,809,826

[45] May 7, 1974

[54] PUNCHED CARD READING TELEPHONE INSTRUMENT

[75] Inventor: John George Laycock Rhodes, London, England

[73] Assignee: Pye Limited, Cambridge, England

[22] Filed: Apr. 26, 1973

[21] Appl. No.: 354,876

Related U.S. Application Data

[63] Continuation of Ser. No. 122,963, March 10, 1971.

[30] Foreign Application Priority Data

Mar. 10, 1970 Great Britain .................... 11441/70

[52] U.S. Cl. ................................ 179/90 CS, 200/46
[51] Int. Cl. ........................................... H04m 1/48
[58] Field of Search ....... 179/90 CS, 90 BD, 90 BB, 179/90 B; 200/46

[56] References Cited

UNITED STATES PATENTS

| | | | |
|---|---|---|---|
| 3,601,552 | 9/1971 | Barnaby et al. | 179/90 B |
| 3,592,972 | 7/1971 | Lane | 179/90 CS |
| 3,555,201 | 1/1971 | Kuehnle | 179/90 B |
| 3,274,345 | 9/1966 | Ham et al. | 179/90 CS |

*Primary Examiner*—Kathleen Claffy
*Assistant Examiner*—G. Brigance
*Attorney, Agent, or Firm*—Frank R. Trifari; Simon L. Cohen

[57] ABSTRACT

A punched card reading telephone instrument wherein a card is ejected at a substantially uniform rate after insertion into the mechanism and is optically read. The encoded putput of the optical reading mechanism is stored in a known push button telephone until the entire card has been read and the entire telephone number has been stored within the push button telephone. Subsequent to the ejection of the card the stored telephone number is transmitted.

13 Claims, 4 Drawing Figures

PUNCHED CARD READING TELEPHONE INSTRUMENT

This is a continuation, of application Ser. No. 122,963, filed Mar. 10, 1971.

Any number of cards may be used and a repertoire of such cards, each having the name of the addressee written at one end, enables any selected telephone address to be "dialled" automatically. The use of a card reader therefore eliminates the tedious manual dialling process and — particularly with addresses containing a large number of digits — avoids lost calls that may otherwise occur as a result of faulty dialling.

Typically, cards cater for a maximum of a sixteen digit telephone address and the type of card in general use stores the decimal digits of the telephone address in binary form. In order to make the recording of storage of a telephone address on the card a simple readily-understood process, some cards are provided, for example with weakened areas such as circles or short strips that can be removed by being pushed out of the card by a convenient pointed object such as a ball-point pen. Each pushed-out area represents a binary digit and a sixteen decimal digit address card thus has sixteen rows of such areas with four areas of each row, these areas representing the decimal values 1, 2, 4, 8 respectively. For example, if the first four digits of a telephone address required to be stored on a card are 5–3–6–9, then the first row (representing the "5") would have the first (1) and third (4) areas removed, the second row would have the first (1) and second (2) areas removed, the third row the second (2) and third (4), and the fourth row the first (1) and fourth (8).

In known card readers, the card is inserted vertically in a slot to its fullest permissible extent. A manually operating switch such as a lever key or push button is then operated to "inform" the card reader that the transmission can commence. The card reader then reads the first row on the card by sensing the locations of the pressed-out areas in that row. The sensing is usually effected by means of four sets of electrical contact springs — one set for each of the four binary values — which make contact through the pressed out areas only. These contact combinations are then translated by the card reader into the appropriate decimal digit and the corresponding number of 'dial' impulses is transmitted to the associated telephone instrument for onward transmission to the telephone exchange.

When the first row, i.e. the first digit of the telephone address has been read and transmitted, the card is indexed by a motor to the next position such that the sensing springsets can read the second row representing the second number. An interdigit pause is inserted after transmitting the first digit either before or after the card is indexed to the next reading position. The second row is now read and transmitted, and a further interdigit pause inserted. The process is then repeated until all the stored digits have been transmitted. A signal is then given to the user to signify that the card may be removed from the card reader; the user then removing the card and replacing in its correct filing position in the repertoire.

Such systems have several disadvantages. For example, the accidental knocking of a card during transmission may result in a lost call. A further disadvantage occurs due to the necessity of providing the user with the facility of removing the card from the reader at any time during the reading and transmission process in order to abandon the call. Extra measures have to be taken to provide this facility and these measures, which allow the card to be removed without undue force being required, generally tend to aggravate the previously mentioned disadvantage of accidental movement of the card. A further disadvantage of known systems is that they are largely mechanical in nature, this making them somewhat cumbersome. This usually results in the card reader being necessarily a separate device from the telephone instrument. Separation of the device from the instrument is further necessitated due to the fact that the cards have to be inserted vertically; so requiring a slot on the upper face of the device. This latter feature is essential, for example, on one type of known instrument in which the card is only partially inserted and is then progressively drawn into the reader during the reading process. This indexing is effected by gravity, the weight of the card causing the progressive indexing. For such systems, the cards have to be comparatively massive and special measures have to be taken to reduce friction to an absolute minimum. In the nongravity-fed types of reader, a driving motor is required for indexing the card and this requires a power supply. Further, in the known systems, the card has to be provided with means for accurate registration at each row during indexing and indexing means have to be provided in the reader.

An object of the present invention is to provide automatic dialling apparatus which overcomes the above disadvantages and which may be powered from the main exchange power supply via the telephone line.

According to one aspect of the present invention there is provided apparatus for automatically transmitting a telephone address recorded on a card inserted into the apparatus, including sensing means operable on insertion of a card, card ejecting means for automatically ejecting the card from the apparatus at a substantially constant rate, reading means for reading the recorded information on the card during ejection of the card, storage means capable of storing the complete address read by the reading means, and transmitting means for transmitting an address stored in the storage means.

The most widely used coded form for the transmission is that of dial-type impulses as previously described, but other coded form such as binary codes or a combination of frequenices may equally well be used. The transmission of any of these codes is, for the present purposes, simply referred to as "dialling". The feature of storing the address enables the card to be read at a rapid rate with the result that the card does not have to be retained in the instrument during the transmitting process.

The various features and advantages of the present invention will be apparent from the following description of exemplary embodiments thereof taken in conjunction with the accompanying drawings, in which.

In British Application No. 282/68, there is disclosed a push-button dialling telephone instrument incorporating storage registers and control circuitry which enables a complete telephone address to be stored and subsequently transmitted when the push buttons are operated in the appropriate sequence representing the address. The digits are stored in binary form in storage registers, translated into the appropriate coded form — typically in the form of dial-type impulses — and transmitted automatically together with the appropriate interdigit pauses between the trains of impulses. As explained in the aforementioned application, alternative coded forms such as binary codes, frequency codes, etc. may be used for dialling. In this way, all the advantages of rapid push-button dialling may be gained on existing telephone exchanges without the necessity for modifying or adding to the existing equipment at the telephone exchange. In the embodiment described herein, the function and circuit operation is explained in relation to the abovementioned pushbutton dialling telephone instrument for the purposes of simplicity and clarity but it will be apparent to any person skilled in the art that if any changes are needed in the circuits as shown to enable them to function in combination with any other telephone instrument incorporating digit storage and transmission means, then such changes will be of an obvious and minor nature only. Although the invention is described in the embodiment in relation to a particular telephone instrument, the invention is therefore not so limited and is readily applicable to any telephone instrument which has the necessary storage facility.

In the push-button dialling telephone instrument described in British Application No. 282/68, each of the dicimal push-buttons has a single make contact which acts as the digital input to the logic circuitry and storage registers. The single signal from each key is translated, where necessary, into the appropriate multiple binary signal and fed to the storage registers. Thus decimal push button keys 1, 2, 4 and 8 need no translation; whereas the signal from push button 7, for example, is translated into the three binary signals representing the decimal values 1, 2 and 4. Thus, in order to store the output of a card-reading unit in the storage registers of the abovementioned telephone instrument, it is only necessary to connect four binary output leads of the card-reading unit to the make contacts of push button keys 1, 2, 4 and 8. In this way, a logic signal "0" appearing on one of the four leads short-circuits the make contact — e.g. by earthing it — and thus performs the same function as if the key had been operated. Normally a logic "1" exists on these leads so that the normal operational function of the push buttons remains unaffected when the card-reading facility is not in use.

Figure 1:
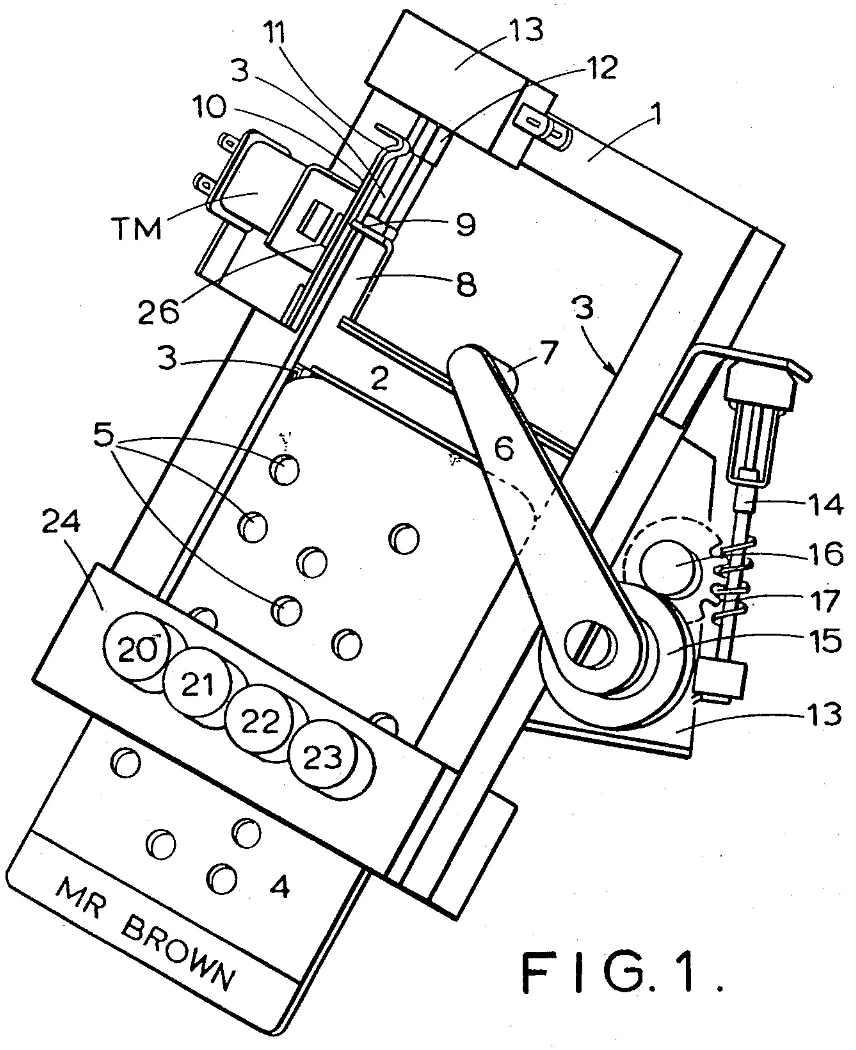
FIG. 1 is a general view of a card reading and ejecting means according to the invention.

Referring now to FIG. 1 of the drawings, accompanying the provisional specification, which shows a general view of the essential features of a card-reading and ejection mechanism, a frame 1 has a carriage 2 slidably mounted thereon in slots 3. A plastic card 4 having punch-out holes 5 corresponding to the binary codes of the constituent digits of the telephone address, is shown partially inserted in the slots 3; these slots acting as guides for the card 4. The inner end of the card 4 bears against the carriage 2. On insertion of the card, the carriage 2 is moved along the slot 3 against the restoring force of a lever arm 6 via a low-friction bush 7.

In operating the card-reading mechanism, the card is pressed into the slots 3 as far as it will go, further movement of the card being prevented by the carriage 2 reaching the ends of the slots and bearing against them. Just prior to the end position being reached, the turn-up portion 9 of extension arm 8 deflects a blade spring 10 having a ramp 11. When portion 9 has passed the end of the ramp 11, spring 10 restores to the position shown, thereby locking portion 9 behind the end of spring 10 and so preventing the carriage returning under the restoring force of lever arm 6. In this locked position, portion 9 depresses the operating pin 12 of a microswitch 13; so operating the electrical contact of the microswitch to sense that a card has been fully inserted to a predetermined position.

The restoring force for lever arm 6 is provided in this example by a standard rotary dial mechanism carried on a mounting plate 13. The operation of such dial mechanisms is well-known and the operation of the mechanism in relation to the card reader may be readily appreciated if lever arm 6 is regarded a part of the normal finger plate of a rotary dial. Insertion of the card thus "winds up" the dial against the force of a restoring spring (mounted on the underside of plate 13), the energy stored in the spring mechanism being later used to eject the card as follows.

When the lock is removed from portion 9, as will be explained later, the dial mechanism causes lever arm 6 to rotate in anticlockwise direction under the control of the restoring and governor 14 via gear wheels 15, 16 and 17. Governor 14 controls the rate of rotation of lever arm 6 and the card 4 is therefore ejected from the slots 3 at an approximately constant rate. The time taken for complete ejection of the card is in the order of one-thid to one-half second. In this way, the card is rapidly returned to the user (the card being "read" during ejection) and the aforementioned disadvantages of known systems are overcome. A particular advantage of this mechanism is that no power is required to drive the mechanism.

When it is desired to release the card for ejection from the locked position, an electromagnet TM (trip magnet) is operated and this attracts an armature-piece 26 fixed to blade spring 10. The whole blade spring is thereby moved towards the polepiece 27 of the trip magnet TM and the ramp 11 of blade spring 10 is thus drawn clear of potion 9 of extension arm 8. The carriage is now free to move along the slots 3 to eject the card under the control of the restoring force applied from the spring mechanism via governor 14 and lever arm 8.

Figure 2:
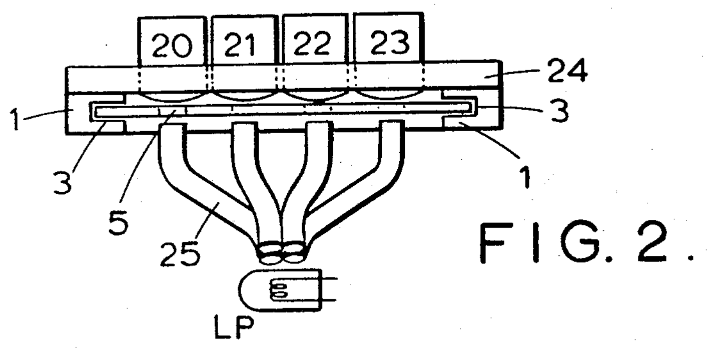
FIG. 2 shows a method of reading the cards.

The reading of the card is effected by four photocells 20, 21, 22 and 23 mounted on a support 24 such that their windows are in close relation with the holes on the card as shown in FIG. 2, which shows an end view of the card 4 in slots 3. The pohtocell windows are aligned with the columns of holes 5 and the holes are illuminated on their undersides by light from a lamp LP via light guides 25.

In FIG. 1, the four vertical columns of holes shown on card 4 may be regarded as representing the digits 1, 2, 4 and 8 reading from the left. Photocell 20 thus senses the '1's, photocell 21 the '2's, photocell 22 the '4's and photocell 23 and '8's.

The first row of holes in the example shown thus represents the digits 1 and 4, the first number of the stored address thus being 5. The second row represents the digit 3 (1+2), the third row 6 (2+4), the fourth row 9 (1+8 just visible), the penultimate row 5 (1+4) and the last row 6 (2+4).

Figure 3:
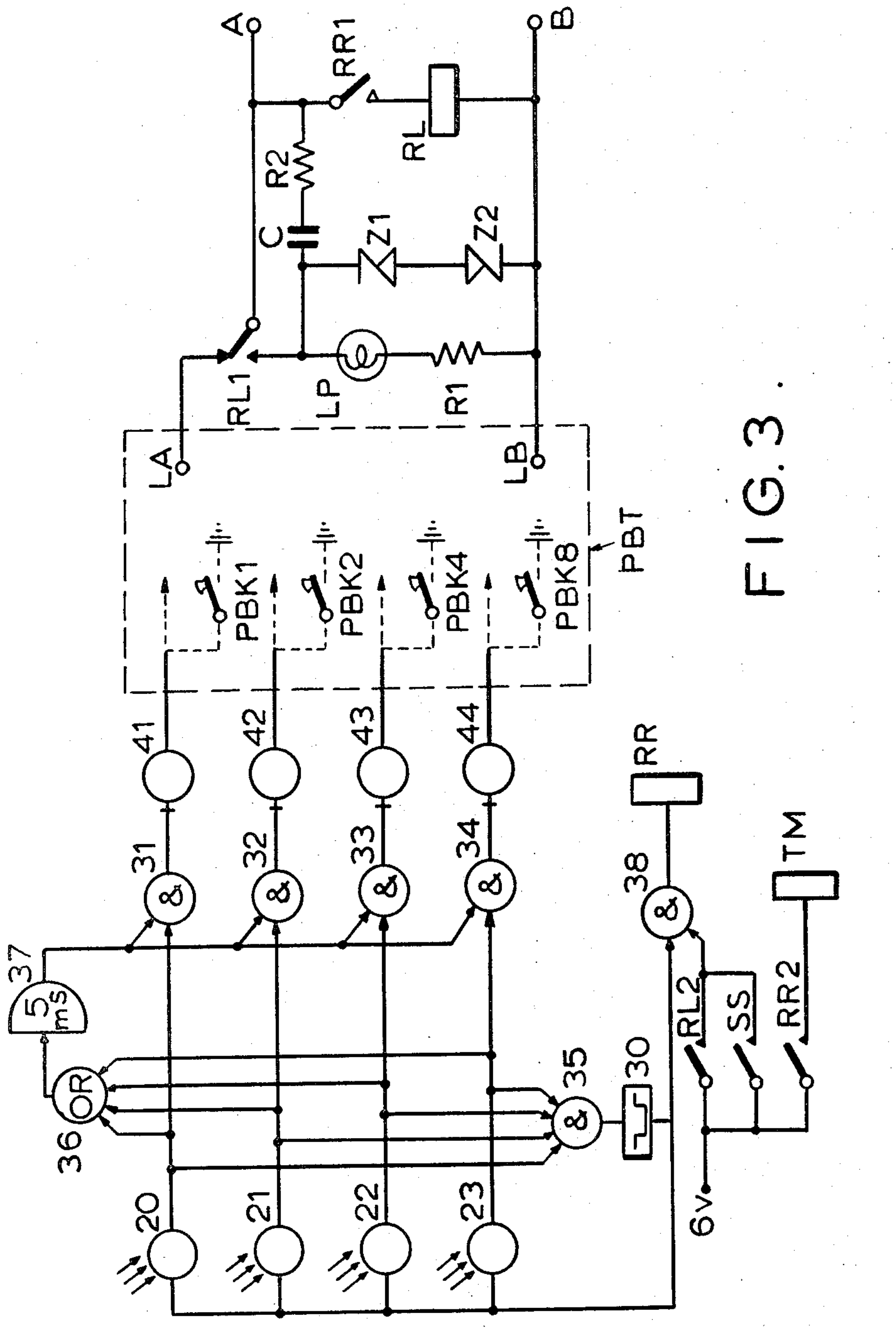
FIG. 3 shows an operational circuit.

FIG. 3 shows a part-schematic circuit of automatic dialling apparatus according to the invention. In this Figure only the essential features of a push-button dialling telephone PBT, having storage and transmitting means as previously described in detail herein, are shown. As can be seen from the Figure, the normal line output terminals LA and LB of the telephone are taken via additional circuitry to the telephone line and the four inputs from the card-reading part of the circuit are connected to the existing make contacts of push-button keys PBK1, 2, 4 and 8 of the telephone PBT.

The output of a 100mS pulse generator 30, normally giving a '1' output, feeds the inputs of the four photocells 20–23. The outputs of these photocells are fed individually to inputs of four AND-gates 31–34 and collectively to inputs of a further AND-gate 35 and of an OR-gate 36. The output of OR-gate 36 is fed via a 5mS delay 37 to second inputs of AND-gates 31–34, the outputs of these AND-gates being fed via individual inverters 41–44 to the existing make contacts of push-button keys PBK1, PBK2, PBK4 and PBK8 in telephone PBT.

Pulse generator 30 also feeds one input of an AND-gate 39 the output of which drives a relay RR, this relay having two contacts RR1 and RR2 the latter of which operates the trip magnet TM and the former of which operates relay RL from the telephone line power. Contact RL1 disconnects telephone terminal LA from the A-wire of the telephone line and connects the latter to the B-wire via lamp LP in series with resistor R1 and also via two back-to-back Zener diodes Z1 and Z2. These diodes maintain a potential of 12 volts across the lamp and resistor irrespective of the polarity of the line power. A further series resistor may be added between contacts RL1 and the junction of lamp LP and Zener diode Z1 if excessive current would otherwise be drawn by the Zener diodes. A spark quench, comprising compacitor C and resistor R2, is connected across contact RL1.

The output of the 100mS pulse generator 30 also feeds one input of an AND-gate 38, the other input of which is fed from a -6V supply line (logic lever '1') via a contact RL2 of relay RL in parallel with contact SS of microswitch 13 (FIG. 1). The -6V supply line is also fed to the trip magnet TM via contact RR2 of relay RR.

The operation of the circuit is as follows:- The output signal of 100mS delay 30 is normally in the '1' state (-6V). The full insertion of an address card to the locked position operates microswitch 13 (FIG. 1) and its contact $S^S$ operates. The reeds a '1' to the other input of AND-gate 38 and relay RR operates. Contact RR1 operates relay RL to the line power on the A and B wires and contact PR2 operates the trip magnet TM. Contact RL1 disconnects the A wire from terminal LA and causes lamp LP to light, the power being derived from the exchange via the A and B wires. Contact RL2 short-circuits contact SS so that the input signal to AND-gate 38 is maintained when the microswitch is released. The operation of trip magnet TM, as previously explained, releases the carriage 2 and the card is ejected from the reader at an approximately constant rate. Microswitch 13 is released as soon as the card starts moving but the release of its contact SS has no effect since contact RL2 is now operated. When the holes 5 in the first row are opposite the window of the photocells, light from lamp LP is allowed to reach photocells 20 and 22 via the light guides 25 and the two holes in the first row. Photocells 20 and 22 thus an enabling signal to AND-gates 31 and 33 and also to OR-gate 36. After the 5mS delay of delay 37, the enabling signal is passed on to the other inputs of AND-gates 31–34. AND-gates 31 and 33 then give a '1' output which is inverted to a '0' (earth output) by inverters 41 and 43 and fed to push button keys PBK1 and PBK4. In the telephone instrument PBT, these signals are stored in the storage registers.

The first row of holes now passes beyond the windows of the photocells and the photocell outputs cease. AND-gates 31 and 33 are inhibited and the earth signal is therefore removed from the push button keys.

When the second row of holes reaches their windows, photocells 20 and 21 are activated and these cause a signal to be transmitted, in the manner described above, to push button keys PBK1 and PBK2. The decimal digit '3' is thus stored in binary form in the storage registers of the telephone PBT. The second row of holes then passes beyond the windows and the signals are removed. In similar manner, the binary forms of decimal digits '6' and '9' are then stored in the registers for the next two rows of holes and process is repeated until all rows of holes have passed the windows and the complete telephone address on the card is stored in the storage registers of telephone PBT. The card is then completely ejected from the mechanism and the user replaces it in a card storage file.

Immediately the card is rejected, all four photocells are illuminated by light from lamp LP. The four resultant signals cause AND-gate 35 to operate and this in turn causes pulse generator 30 to give a '0' output (earth pulse) of 100mS duration. The photocells are thus de-energised for this period and their output signals cease. Pulse generator 30 operates very rapidly as soon as the four input enabling signals are received from the photocells and the removal of these signals by the 100mS pulse occurs well within the 5mS delay period of delay 37. AND-gates 31–34 cannot therefore operate and no signals are passed on to the push button keys under this condition.

The 100mS earth pulse inhibits AND-gate 38 and relay RR releases. Contact RR1 releases relay RL and contact RR2 releases trip magnet TM. Contact RL1 restores the A-wire of the telephone line to terminal LA and also extinguishes lamp LP. Contact RL2 further inhibits AND gate 38 so that it cannot reoperate at the end of the 100mS pulse. The circuit is now back to normal and a signal is given to the telephone instrument that transmission of the stored digits may commence, this signal being the reconnection of the A-wire to terminal LA. The complete telephone address is now automatically transmitted by the telephone PBT in the manner fully described in British Application No. 282/68 and the call progresses in the normal manner.

The automatic dialling apparatus according to the invention may be readily adapted for use on Private Automatic Branch Exchanges (PABX's) in which the main public telephone network may be reached by dialling a predetermined access digit. In such PABX's, to make a call into the public network, an access digit — e.g. '9' — is dialled and the calling instrument is then switched through to an outgoing exchange line from the PABX. The main exchange dialling tone is then received and the fully normal telephone address can then be dialled.

Figure 4:
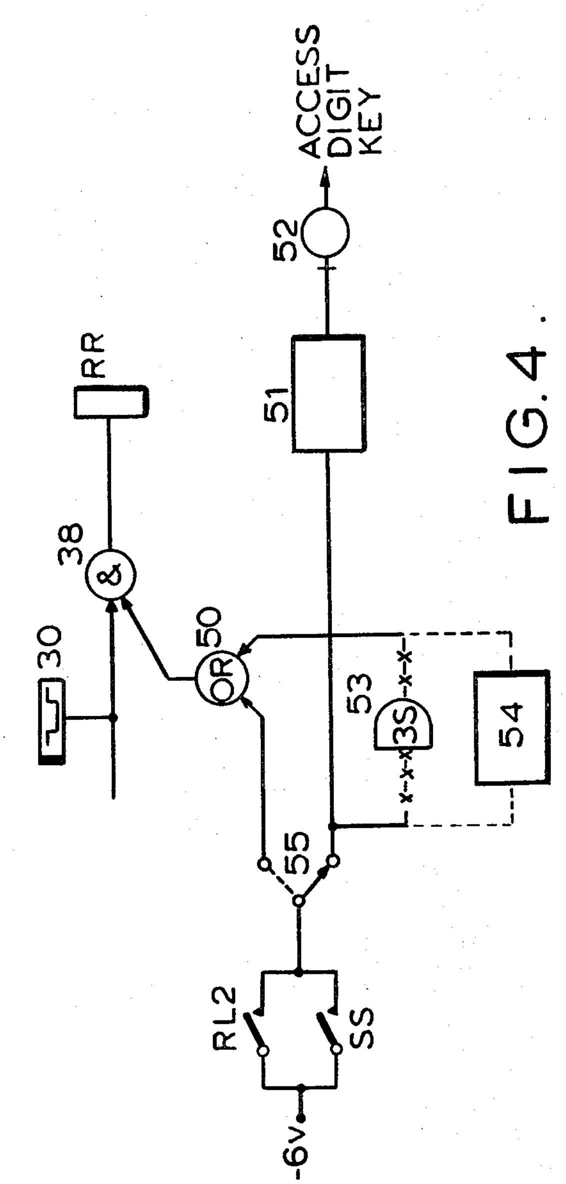
FIG. 4 shows an adaption circuit for PABX working.

Additional circuitry suitable for providing main exchange calls automatically on a PABX with the apparatus according to the invention is shown in FIG. 4. In this figure, the pulse generator 30, AND-gate 38 and relay RR are the same as those of FIG. 3. The additional circuitry is an OR-gate 50, an edge trigger circuit 51, an inverter 52, either a three-second delay 53 or a dial tone detector 54 according to choice, and a switch 55. The edge trigger is a one-shot multivibrator which detects the leading edge of an incoming pulse and immediately changes to its other state for a predetermined period. At the end of this period, the multivibrator returns to its original state but cannot re-trigger while the incoming pulse is still present. Thus only one output pulse is given for an input pulse of any duration. Such one-shot circuits are well known.

Dial tone detector 54 is also a well-known type of circuit, being in common use in electronic telephone systems. Such detectors are connected to the telephone line and give an output signal when, and only when, dial tone is received at its input. Such detectors are used where it is necessary to delay signalling in automatic signalling systems until it is confirmed that the receiving equipment is ready to accept the signals — this confirmation being given by the receipt of dial tone.

With switch 55 in the dotted position, the operation of the circuit is the same as that previously described, except that the -6V from operated contact $S^S$ is fed to AND-gate 38 via the additional OR-gate 50. With switch 55 in the solid-line position shown (for use with PABX's), the start signal given on the operation of contact SS causes edge trigger 51 to give a single output pulse; this '1' pulse being inverted to a '0' by inverter 52. The output of inverter 52 is connected to the make contact of whichever push button key represents the access digit. On pushing the card into the reader, therefore, the access digit is immediately and automatically stored in the storage registers of the telephone. Relay RR cannot operate at this stage since there is no output from OR-gate 50. Relay RL therefore remains released and the telephone transmits the access digit to the PABX since, as previously explained, the telephone will transmit its stored digits provided that contact RL1 is not operated.

If a main exchange line from the PABX is generally immediately available, certainly within three seconds, the shown cross-and-dash connections and detecter 54 are omitted. The signal from contact RL2 is delayed for three seconds by delay 53 being fed to OR-gate 50. At the end of this delay period, the output of OR-gate 50 operates AND gate-38 and relay RR operates. This causes the card-reading sequence to commence as previously described having given the PABX adequate time to select an exchange line. If there is likely to be more than a three second delay before receiving dial tone from the main exchange, the 3 second delay 53 is omitted and dial tone detector 54, together with its associated wiring, is provided. The operation is the same as before with the exception that, in this case, the dial tone detector is switched on by the signal from contact RL2 and waits for dial tone before it transmits a '1' signal to OR gate 50.

Switch 55 may be in the form of a manually operable switch or a wired link according to requirements. If the card-reading facility is to be used on the internal lines of PABX as well as for external exchange lines, then a manual switch such as a lever key must be used; the switch being thrown for main exchange calls so that the access digit is provided automatically. Normally, however, cards are only used for calls external to the PABX and switch 55 is in the form of a wired link in the full-line position shown.

From the foregoing, it can be appreciated that the electrical equipment driven from the -6V supply is minimal; there being no driving power required for the motor, and the lamp LP and relay RL derive their power from the telephone line. These two components also serve to maintain the calling loop across the line during the reading process. By using field effect transistor integrated circuit logic, the power required for the logic is reduced to a minimum and this makes it possible to drive the -6V supply from a storage cell which is kept charge by the line current.

A feature of the card reader described is that the card may be inserted in the horizontal plane; vertical entry no longer being necessary. This enables the whole mechanism of the card reader together with the associated circuitry, to be mounted in a shallow area no larger than the base of a normal telephone. The result is that only a small increase in the depth of the normal casing is required in order to provide a complete card-reading telephone instrument. Alternatively the equipment may be arranged in a shallow plinth on which the telephone may be mounted; so providing a neat and compact arrangement having considerable commercial as well as manufacturing advantages. Conveniently, the control, storage, and transmitting equipment normally mounted in the telephone instrument may also be accommodated in the plinth. If a plinth, or other form of separate housing, is used it alternatively may be advantageous to locate it a distance away from the normal telephone instrument — e.g. to form part of a desk on which the telephone is located. Such separation obviously does not affect the invention, the card reading unit being regarded as being part of the telephone instrument for this purpose, even if physically separated therefrom.

Although the reading device described in relation to the exemplary embodiment comprises a lamp LP, light guides 25 and photocells 20, 21, 22 and 23 the invention is not so limited and alternative reading devices may be used. For example lamp LP and light guides 25 may be replaced by four light-emitting diodes and the photocells 20–23 may be replaced by photo-sensitive field-effect transistors preferably of the metal-insulator-semiconductor type.

Further, the invention is not limited to the use of cards having perforations indicative of the telephone address, but includes apparatus which can read information stored in magnetic form on the card.

1. Apparatus for automatically transmitting a telephone address recorded on a card inserted into the apparatus, including sensing means operable on insertion of a card, card ejecting means for automatically ejecting the card from the apparatus at a substantially constant rate, reading means for reading the recorded information on the card during ejection of the card, storage means capable of storing the complete address read by the reading means, means for sensing the complete ejection of the card, and transmitting means responsive to the sensing means for transmitting an address stored in the storage means subsequent to the ejection of the card.

2. Apparatus according to claim 1 wherein the ejecting means is operable on operation of the sensing means.

3. Apparatus according to claim the wherein he sensing means includes an electrical contact operable on insertion of a card to a predetermined position.

4. Apparatus according to claim 1 including a spring mechanism which is deflectable and stores energy during insertion of the card and which subsequently releases the stored energy to eject the card.

5. Apparatus according to claim 4 in which the spring mechanism acts through governor means to eject the card at a substantially constant rate.

6. Apparatus according to claim 4 including an electromagnetically operated latching device which in its normal stage latches the spring mechanism in its deflected position when the card reaches the predetermined position and which in its operated state releases the spring mechanism which then acts to eject the card.

7. Apparatus according to claim 6 wherein the latching device is operable by the sensing means.

8. Apparatus according to claim 1 wherein the address is transmitted in the form of impulse trains.

9. Apparatus according to claim 1 wherein the address is transmitted in the form of a multifrequency code.

10. Apparatus according to claim 1 wherein the reading means includes a light emitter and a plurality of light sensitive elements so arranged that, on insertion of a card, the emitter lies to one side of the major plane of the card and the element lie to the other side of the plane.

11. Apparatus according to claim 1 wherein operation of the sensing means on insertion of a card causes a predetermined digit to be transmitted irrespective of the address on the card.

12. Apparatus according to claim 11 including delay means operative on operation of the sensing means, which delay means delays the ejection of the card until after transmission of the predetermined digit.

13. Apparatus according to claim 11 including tone detecting means operable on receipt of a signal tone thereby, the tone detecting means being arranged to permit ejection of the card only when the signal tone has been received.

* * * * *

PO-1050
(5/69)

UNITED STATES PATENT OFFICE
CERTIFICATE OF CORRECTION

Patent No. 3,809,826 Dated May 7, 1974

Inventor(s) JOHN GEORGE LAYCOCK RHODES

It is certified that error appears in the above-identified patent and that said Letters Patent are hereby corrected as shown below:

Col. 1, between lines 4 and 5 insert the following as a paragraph:

-- This invention relates to automatic dialling apparatus for automatically transmitting a telephone address recorded on a card. Such apparatus includes a device for reading the address recorded on the card, these devices being commonly known in the art as "card-readers" and taking the general form of a device into which an address card, containing a complete telephone address recorded thereof may be inserted - whereupon the device reads the information on the card and translates it as it is being read into the appropriate trains of rotary-dial type impulses (Strowger systems) forming the telephone address, these impulses being transmitted via the telephone lines to the telephone exchange.--

Signed and sealed this 31st day of December 1974.

(SEAL)
Attest:

McCOY M. GIBSON JR.
Attesting Officer

C. MARSHALL DANN
Commissioner of Patents

UNITED STATES PATENT AND TRADEMARK OFFICE

CERTIFICATE OF CORRECTION

PATENT NO. : 3,809,826

DATED : May 7, 1974

INVENTOR(S) : JOHN GEORGE LAYCOCK RHODES

It is certified that error appears in the above-identified patent and that said Letters Patent are hereby corrected as shown below:

IN THE SPECIFICATION

Col. 1, line 60, after "replacing" insert --it--;

Col. 3, line 31, "dicimal" should be --decimal--;

line 53, after "ejection" insert --control--;

Col. 4, line 25, after "restoring" insert --spring--;

Col. 5, line 67, after "thus" insert --pass--;

Col. 6, line 66, "fully" should be --full--;

Col. 7, line 47, "detecter" should be --detector--;

IN THE CLAIMS

Claim 3, line 1, after "claim" cancel "the" and insert --1--;

line 1, "he" should be --the--;

Claim 10, line 5, "element" should be --elements--;

Signed and Sealed this

*Fifteenth* Day of *November 1977*

[SEAL]

*Attest:*

RUTH C. MASON
*Attesting Officer*

LUTRELLE F. PARKER
*Acting Commissioner of Patents and Trademarks*